July 25, 1972  J. N. McGEE ET AL  3,679,516
PROCESS FOR PRODUCING AN AIR-IMPERVIOUS TIRE FABRIC
Filed April 3, 1969
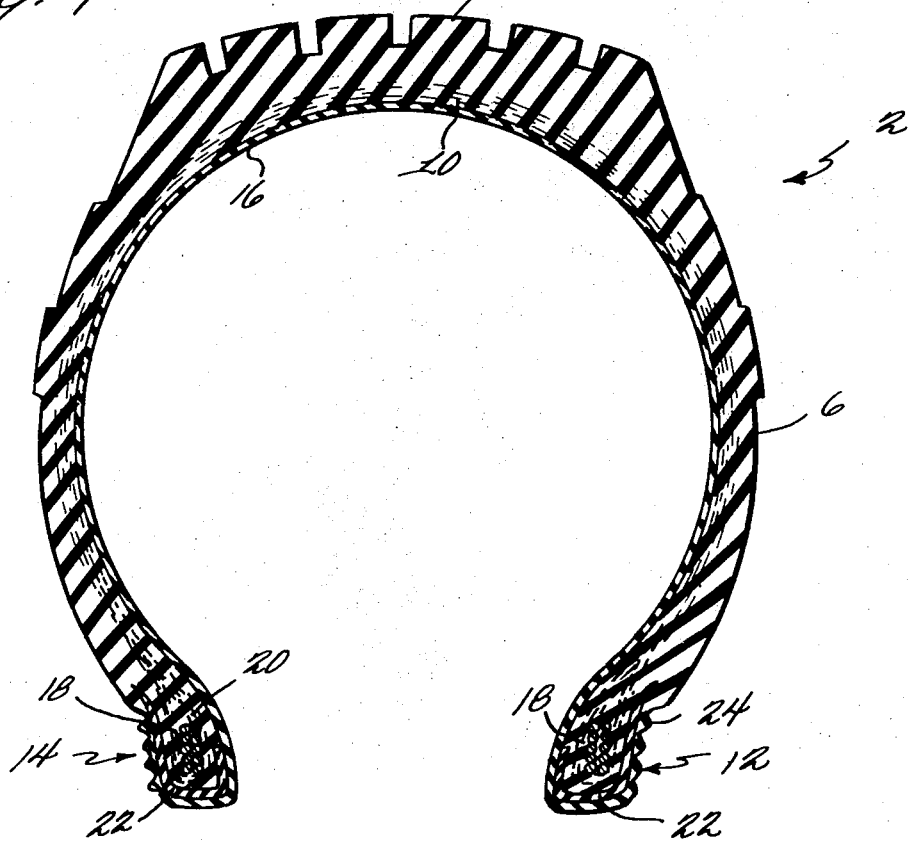
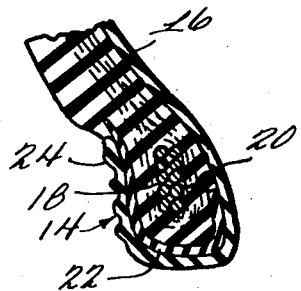
INVENTORS
JAMES NEWTON McGEE
THOMAS FRANKLIN GRIFFIN
BY
Cushman, Darby & Cushman
ATTORNEYS United States Patent Office 3,679,516
Patented July 25, 1972

3,679,516
PROCESS FOR PRODUCING AN AIR-IMPERVIOUS TIRE FABRIC
James Newton McGee, Pleasant Garden, and Thomas Franklin Griffin, Kernersville, N.C., assignors to Burlington Industries, Inc., Greensboro, N.C.
Filed Apr. 3, 1969, Ser. No. 813,184
Int. Cl. C09j 5/04
U.S. Cl. 156—315      6 Claims

ABSTRACT OF THE DISCLOSURE

A process for preparing an air-impervious tire fabric which comprises padding the fabric at pressures of from 1 to 20 p.s.i.g. with an aqueous resorcinol-formaldehyde/latex composition, where solids content is in the range of 32–43% by weight, partially drying at a temperature of from 125 to 175° F. the thus padded fabric in the relaxed state to a moisture content of 5–15%, then further padding the partially dried fabric with aqueous resorcinol-formaldehyde/latex composition having a solids content in the range of 20–43% by weight and drying and curing the thus treated fabric at a temperature of from 200 to 450° F.

---

The present invention relates to improved tire fabrics, such as chafer and flipper strips, and tubeless tire constructions containing the same.

Conventional tubeless tire constructions employ a carcass of rubber provided with wheel rim-engaging portions or beads which are reinforced by circumferentially extending cores of wire or other relatively rigid material. These wire cores are covered by strips of fabric known in the art as "flipper strips," the latter extending upwardly into the side walls of the tire to stiffen the latter. Over the exterior of the tire carcass in the regions of the beads and extending at least partially about the latter are chafing or finishing strips which are intended to resist abrasion of the tire by the rim flanges on which the tire is mounted. These flipper and chafing or finishing strips may comprise woven or nonwoven fabric and a wide variety of materials and fabric constructions have previously been proposed.

One of the major considerations in preparing tire fabric of the above type is the requirement that the fabric be nonairwicking or air-impermeable in order to prevent the escape of air from the tire.

Another important characteristic for tire fabrics is that the fabric demonstrate effective adhesion to the natural or synthetic rubber components used in the tire constructions.

Numerous efforts have been directed towards the provision of air-impervious tire fabrics made from multi-filament nylon, polyester or like textile material but there are still many problems in obtaining the necessary combination of adhesion and nonairwicking or air-impermeability. This is particularly true in the case of nylon chafer fabric for use in the manufacture of aircraft and other heavy duty types of tires where the high air pressure in the tire places severe demands on the fabric from the standpoint of adhesion and air leakage. However, the problems with respect to air-impermeability and adhesion are in no sense limited to this heavy duty type of nylon chafer fabric.

The principal object of the present invention is to provide certain improvements in preparing air impervious tire textiles such as flipper or chafer fabric, from multi-filament nylon yarn or similar synthetic hydrophobic material, whereby prior art disadvantages are obviated. Other objects will also be apparent with reference to the following detailed description of the invention and the accompanying drawings wherein:

FIG. 1 is a fragmentary perspective view partially in section of a tire showing the use of tire textiles which may be treated according to the invention; and FIG. 2 is an enlarged fragmentary sectional view of said tire.

Referring more specifically to the drawings, FIG. 1 shows a tubeless tire 2 which includes a tread portion 4 surrounding an annular inner carcass 6 of resilient elastomeric material, such as natural or synthetic rubber, and reinforcing cords, the latter being disposed in superposed plies 10. These cords 10 may comprise multi-filament nylon yarn or the equivalent and it is well known to finish such yarn with a latex composition, usually a resorcinol-formaldehyde/latex, to improve adhesion to the rubber carcass or rubber tire components.

The inner periphery of the tire is defined by spaced bead portions 12 and 14. These bead portions are intended to fit on the rim of a vehicle wheel and cooperate therewith to provide the desired air chamber. The interior of the tire carcass is usually provided with a layer or lining 16 of an impervious elastomeric material such as the isoolefin-diolefin copolymer commonly known as butyl rubber. The bead regions 12 and 14 are identical and are formed by turning the edges of the cord plies 10 successively about a circumferentially-extending bead core 18, which may be formed by a bundle of wires suitably wrapped and provided with the flipper strip 20, the ends of which extend radially of the side wall of the tire. Extending externally over the turned ends or edges of the reinforcing cord plies 10 in each bead is the chafer or finishing strip 22. The strip 22 is relatively narrow and extends transversely of the tire beads with the inner edge of each such strip positioned within the interior of the tire carcass just above the bead toe. The strips extend across the bead bases and radially of the side walls a short distance to positions therein above the outer edges of the tire rim on which the tire is adapted to be mounted. The chafer strips 22 are usually, but not necessarily, calendared or otherwise laminated with unvulcanized elastomeric material on both sides so that during curing of the tire they bond to the inner layer or liner 16 and the outer covering or side wall rubber 24.

As indicated heretofore, the flipper and chafer strips 20 and 22, respectively, must be air-impervious due to the fact that, in tubeless tires, air pressure in the tire cavity forces air against and under the tire bead and if the chafer fabric, for example, is not impervious to the passage of air, each individual fiber will serve as a pipe to conduct air out of the cavity into the body of the tire or to the outside atmosphere thereby causing the tire to deflate. In view of this, it is well known practice to impregnate the woven or nonwoven fabric which is to be used in making these chafer and flipper strips, with a composition containing resorcinol-formaldehyde and a rubber latex. The fabric impregnation with this latex composition may be repeated one or more times, as desired, followed each time by drying.

The above described treatment of the fabric is intended to render the same both air-impervious and suitably adherent to the rubber carcass or rubber tire components. However, consistently satisfactory products are not attainable, especially when working with textile material which may be used with heavy duty tires, e.g. fabric woven from 720–840 denier, 140 filament nylon yarn having some twist therein (typically 7 turns). These heavy duty tires require high adhesion and complete air-impermeability at relatively high pressure (e.g. 150–300 p.s.i.) and, in the absence of special treatments, supplementing the resorcinol-formaldehyde latex compositions, it has not been possible to obtain the desired combination of adhesion and air-impermeability. One modification which has been useful for preparing effective nylon or polyester tire fabrics is described in U.S. Pat. 3,282,724, where the fabric is impregnated with a latex, then treated with dilute volatile acid to coagulate the latex in situ, dried, impregnated with resorcinol-formaldehyde/latex composition and then again dried. As noted, this process gives a useful tire fabric but the acid coagulating step requires careful control to obtain the desired results and it would be preferable to have a process which eliminated this step if this could be done without undesirably effecting adhesion and air-impermeability properties. The process of the present invention, as described below, accomplishes this.

Broadly described, the process of the present invention involves (a) padding the nylon or polyester tire fabric with an aqueous resorcinol-formaldehyde/latex composition, where solids content is in the range of 32–43% by weight, (b) partially drying the thus padded fabric in the relaxed state to a moisture content of 5–15%, then (c) further padding the partially dried fabric with an aqueous resorcinol-formaldehyde/latex composition having a solids content in the range of 20–43% by weight and then (d) drying and (e) curing the thus treated fabric.

The success of the invention as described above is dependent on several critical features. For one thing, it has been found essential, following the first padding operations, to only partially dry the padded fabric to a moisture content of 5–15% by weight (above normal moisture content). Surprisingly, complete drying of the fabric makes it difficult to impregnate the fabric in the further padding operation and thus lowers the possibility of making the fabric nonairwicking (i.e. air-impermeable).

It is also essential to observe the solids contents specified for the aqueous resorcinol-formaldehyde/latex compositions. Actually, the same composition may be used for the first and further paddings although, as indicated, it is possible to use a lower solids content for the subsequent padding. More particularly, it is necessary to use a composition containing at least 32% solids for the first padding operation if air-impermeability or effective blockage is to be obtained. Similarly, it appears that a composition of at least 20% solids must be used in the second padding operation for effective results. The upper limit of about 43% solids for both padding operations is essential to obtain optimum adhesion. A solids content of 32–36% for both padding operations gives the best air blockage and adhesion properties.

Drying the fabric in the relaxed state, at least after the first padding operations and preferably also after the second, is another important feature of the present invention. This can be accomplished by overfeeding the impregnated fabric onto a pin frame at 3–15% overfeed, preferably about 5%, for the drying operation.

In a preferred way of carrying out the invention, the first padding operation includes passing the fabric through two sets of mangles or pad rolls. The first pad bath contains 32–36% resorcinol-formaldehyde/latex solids (called RFL for convenience) and maximum pad pressure (e.g. 10 to 20 p.s.i.g.). The second pad bath contains 32–36% RFL with minimum even pad pressure (1 to 5 p.s.i.g.). The fabric is then over-fed onto a pin frame at 5% overfeed and dried at 125–175° F., to a moisture content of 5–15% by weight. As noted earlier, this moisture content is of critical importance to the success of the invention.

After partial drying, the fabric is preferably run through two sets of mangles. This can either be two separate units or a three roll unit for the second pass. In this step, the fabric is impregnated with 20–36% RFL in the pad baths. The pad rolls should be covered in such a way as to impregnate the yarns and yet clean the surface of the yarns. A soft spongy surface $\frac{1}{32}$–$\frac{3}{32}$ inch thick on hard surface pad rolls is used to clean the surface. The cleaning of the surface of the fabric is necessary to obtain maximum adhesion. At the same time, the RFL on the second pass must be forced into the yarn bundles to obtain diffusion properties. Thereafter, the fabric is again dried and cured by passing the fabric through a drying oven or the like at a temperature of 200–450° F.

A preferred RFL composition for use herein may be described as an aqueous, desirably organic solvent-free, alkaline mixture of partially condensed resorcinol-formaldehyde reaction product (i.e. a resole) and a synthetic rubber latex wherein the ratio of resole to latex solids is within the range of 1:12 to about 2:2.5, preferably 1 part resole solids per 3.5 to 10 parts latex solids. The composition may be prepared in the manner described in U.S. Pats. 3,030,230 or 3,240,650.

The latex solids may comprise vinyl pyridine-butadiene-styrene terpolymer alone but it is preferred to use a mixture thereof with styrene-butadiene copolymer and natural rubber since this mixture seems to give the best overall results. A particularly advantageous latex mixture of this type comprises a 10/45/45 (solids) blend of natural rubber, terpolymer and styrene-butadiene copolymer although effective results can be obtained using blends of natural rubber, terpolymer and copolymer in other percentages e.g. down to about 5% terpolymer, and from 1–15% natural rubber, balance styrene-butadiene copolymer (percentages being given on a solids by weight basis).

A particularly desirable vinyl pyridine-butadiene-styrene terpolymer latex for use herein is that available under the trade name "Gentac" (General Tire). Other equivalent terpolymers are available as Hycar 2518 (Goodrich); Pyratex B (Naugatuck): Pliolite VP–100 (Goodyear); and Butaprene PL–29 (Firestone Plastics). These terpolymers may comprise, in parts by weight, from 50 to 95 parts butadiene, 5 to 50 parts vinyl pyridine and, per 100 parts of butadiene/vinyl pyridine, from 5 to 30 parts styrene. Typically suitable terpolymers for use herein are described in Mighton 2,561,215; Cislak et al. 2,402,020 and Wilson 2,652,353.

One suitable styrene-butadiene rubber for use herein has a Mooney viscosity of 65, usually contains 48% bound styrene and is produced at total solids of 53% but is usually blended down to 48%. Another styrene-butadiene rubber contains a rosin acid emulsifier, has a Mooney viscosity of 70 and contains 46% styrene at 49% solids available. These are both hot polymerized latices. Usually, hot latices are held within a Mooney viscosity of 80 to 50 and contain from 45 to 55% bound styrene.

Any conveniently available natural rubber latex may be used herein for blending with the vinyl pyridine terpolymer and styrene-butadiene copolymer latex as aforesaid.

Advantageously, the latex solids employed have the smallest particle size. Usually, this is of the order of 600–1200 angstroms (average).

Wet pickup after each padding operation generally will fall in the range of 75–90% based on the weight of the fabric before treatment. Solids add-on will usually be 20 to 30% by weight after the partial drying following the first padding operation to 35% after drying and curing following the second application of RFL. It will be appreciated, however, that the amount of solids add-on and the solids content which may be necessary to give nonairwicking will vary substantially from one situation to another depending on such factors as the nature and construction of the textile materials involved.

The partial drying step should be carried out at a significantly lower temperature than the final drying and curing. Thus, the first drying should be carried out at about 125–175° F. usually over a period of 1 to 5 minutes while the fabric is in the essentially completely relaxed state. The final drying and curing at 200–450° F., most usually 275–330° F., may be accomplished in from 0.75 to 1.5 minutes. The fabric during this last-mentioned drying and curing may be in the relaxed state or taut.

Nylon or polyester fabric or the like treated in the manner indicated may be cut into the desired shape and size used directly in tire construction. In the case of chafer fabric, however, it is generally the practice to calendar a sheet of unvulcanized elastomer on each side of the fabric before it is used to prepare the tire as indicated heretofore. Desirably, the elastomer sheet applied to one side of the fabric is butyl rubber or like material of high fluid imperviousness while the rubber sheet on the other side of the fabric may be natural compounded rubber, GRS or the like. The resulting laminate is cut into strips as desired and used to complete the tire structure, the strips being bonded to the rubber tire carcass during the subsequent heat/pressure molding and vulcanizing.

Any woven or nonwoven fabric, e.g. plain or basket weave constructions comprising multifilament nylon, polyester or other synthetic hydrophobic thermoplastic textile may be effectively treated according to the invention. As typical examples of woven fabric constructions treated herein there may be mentioned the following:

|   | Ends/picks per inch | Material |
|---|---|---|
| 1 | 17 x 17 | 840 denier, 56 filaments, 7 turns nylon (Type 6). |
| 2 | 17 x 17 | 840 denier, 140 filaments, 7 turns nylon (Type 66). |
| 3 | 19 x 20 | 840 denier, 140 filaments, 12 turns nylon (Type 66). |
| 4 | 24 x 26 | 720 denier, 140 filaments, 7 turns nylon (Type 330). |
| 5 | 15 x 16 | 2 ply 420 denier, 68 filaments 16¼ Z/15S nylon (Type 66). |
| 6 | 22 x 23 | 900 denier, 9 filaments 3Z nylon (Type 66). |
| 7 | 22 x 23 | Filling. 720 denier; warp, 900, denier: 9 filaments 3Z nylon (Type 66). |

The invention is illustrated but not limited by the following example wherein parts and percentages are by weight unless otherwise stated:

EXAMPLE

Woven nylon chafer fabric made of 1140 ends of 840 denier, 140 filament nylon yarn with 7 turns Z twist (17 ends and 17 picks per inch) was passed through two sets of pad rolls. The first pad bath was an aqueous resorcinol-formaldethyde/latex composition (RFL) prepared as described below containing 32% solids. The roll pressure at the first pad was 15 p.s.i.g. (maximum). The fabric was then run through a second pad bath using the same RFL composition as before but with minimum even pad pressure (2 p.s.i.g.). The fabric was then overfed at 5% overfeed on a pin frame and partially dried to about 7-8% moisture at 160° F. Solids add-on at this point was 25%.

The partially dried fabric was then run through two sets of mangles, the fabric being again impregnated twice with the same 32% RFL composition. In this instance, the pad rolls were covered with a soft sponge 1/32 inch thick so as to help clean the fabric surface. The fabric was then passed through a drying oven to dry out at 250° F. with curing at 330° F. The solids add-on at this stage was 35%.

A three ply peel adhesion test section was prepared by sandwiching a layer of 40 mil compounded, uncured rubber stock between two layers of the fabric and this assembly was cured under normal curing conditions for this stock of 30-45 minutes at 290° F., and a pressure of at least 120 p.s.i. based on the area of the rubber layer. On testing the peel adhesion between the fabric and rubber using a 2 inch width test section and a jaw separation speed of 2 inches per minute, stock failure occurred indicating that the adhesion was greater than the strength of the rubber stock.

Test sections for air diffusion testing were tested in the manner shown in U.S. Pat. 3,034,336 and demonstrated 0×0 air premeability at 300 p.s.i., i.e. they were completely air-impermeable or nonairwicking.

The RFL composition used in this example was prepared as follows using Parts A and B as indicated:

PART A

| | |
|---|---|
| Resorcinol | 13.0 |
| 37% formaldehyde | 7.0 |
| NaOH flakes | .1 |
| Water to make 6.26% resin solution. | |

PART B

|   | Wet basis, parts | Dry basis, parts |
|---|---|---|
| 6.25 resin solution (part A) | 19.6 | 1.23 |
| 10/45/45 latex | 26.0 | 10.66 |
| 10% Triton X-100 solution | 1.26 | 0.126 |
| Water to give 32% solids content | | |

Preparation of Part A

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resol resin solution (Part A) was used in the preparation of the composition (Part B).

Preparation of Part B

The 10/45/45 latex was prepared by measuring into the mixing tank with stirring 10 parts natural rubber latex, 45 parts Gentac and 45 parts styrene-butadiene copolymer latex with a Mooney viscosity of 65 (parts being on a solids basis). The Triton solution was added and the water and resin solution (Part A) were then slowly added. The resulting composition is ready for immediate use but may be stored for a limited time (about 3 days) at room temperature, or, for prolonged periods of time under refrigeration.

Various modifications may be made in the invention described herein. Thus, while the example given above is specifically directed to the treatment of nylon fabric, same being preferred for tire fabric, it will be recognized that polyester fabrics or the like may also be processed according to the invention. In the case of polyester fabrics, it may be preferable to pretreat or post-treat the fabric with polyisocyanate, e.g. polymethylene polyphenyl polyisocyanate (PAPI) to improve adhesion characteristics as described in U.S. Pat. 3,240,650. Thus the scope of the invention is defined in the following claims.

We claim:

1. A process for preparing an air-impervious tire fabric which consists of first padding the fabric at pressures of from 1 to 20 p.s.i.g. with an aqueous resorcinol-formaldehyde/latex composition, where solids content is in the range of 32–43% by weight, partially drying at a temperature of from 125 to 175° F. the thus padded fabric in the relaxed state to a moisture content of 5–15%, then submitting the partially dried fabric to a second padding with aqueous resorcinol-formaldehyde/latex composition having a solids content in the range of 20–43% by weight, and drying and curing the thus treated fabric at a temperature of from 200° to 450° F.

2. The process of clam 1 wherein said fabric is a nylon chafer fabric.

3. The process of claim 1 wherein said fabric is a polyester chafer fabric.

4. The process of claim 1 wherein the solids content of the composition used in the padding steps is in the range of 32–36% by weight.

5. The process of claim 4 wherein the latex comprises a blend of vinyl pyridine-styrene-butadiene terpolymer, styrene-butadiene copolymer and natural rubber.

6. The process of claim 5 wherein the latex is a blend of 10% natural rubber, 45% terpolymer and 45% copolymer on a solids, by weight, basis.

References Cited
UNITED STATES PATENTS

| | | | |
|---|---|---|---|
| 2,691,614 | 10/1954 | Wilson | 156—110 A |
| 3,194,294 | 7/1965 | Van Gils | 156—110 |
| 3,240,251 | 3/1966 | Atwell | 117—161 UD |

CARL D. QUARFORTH, Primary Examiner

P. A. NELSON, Assistant Examiner

U.S. Cl. X.R.

156—110 C, 111; 117—138.8 N, 138.8 F, 161 UT; 161—156